March 13, 1956    M. R. EMBER ET AL    2,737,719
CUTTING DEVICE
Filed May 5, 1953
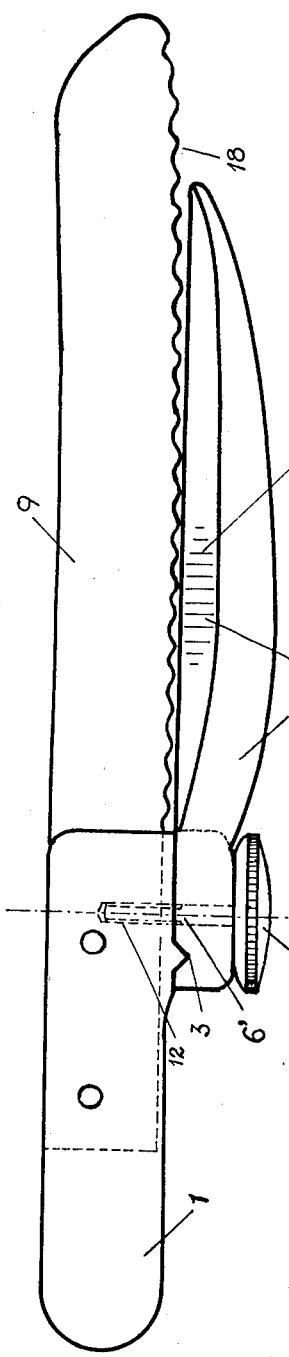
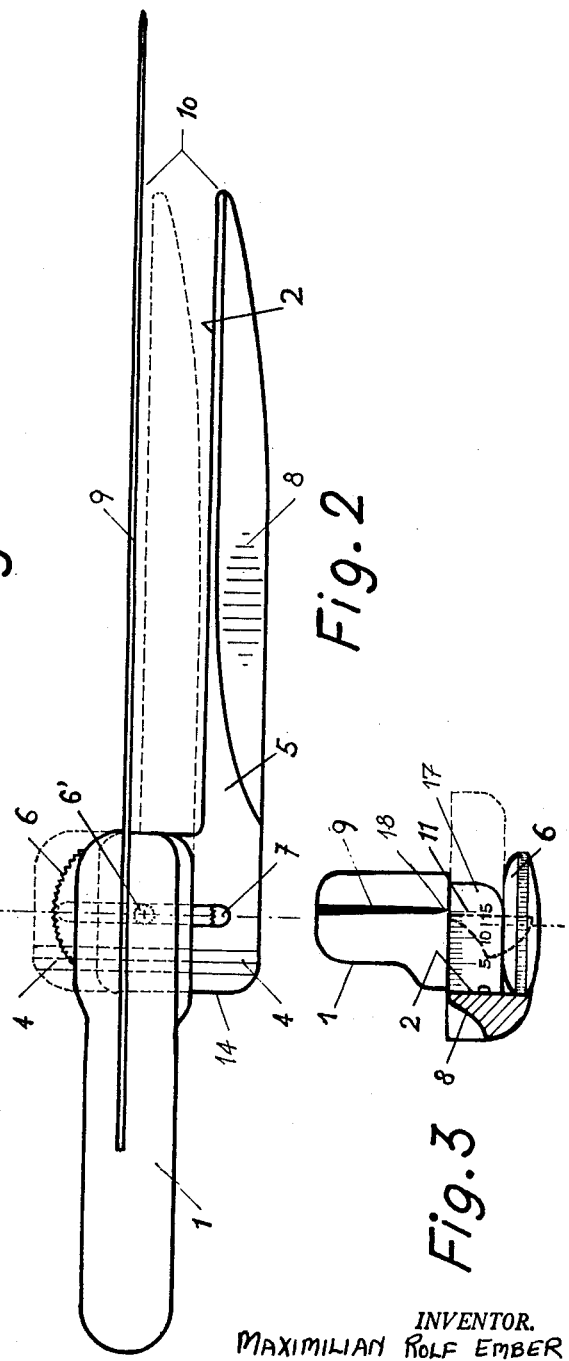
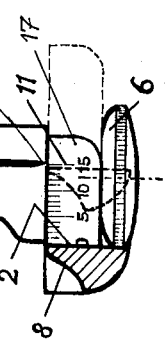
INVENTOR.
MAXIMILIAN ROLF EMBER
AND ALEXANDER EMBER
BY United States Patent Office 2,737,719
Patented Mar. 13, 1956

2,737,719

CUTTING DEVICE

Maximilian Rolf Ember and Alexander Ember, Zurich, Switzerland

Application May 5, 1953, Serial No. 353,044

Claims priority, application Switzerland October 17, 1952

3 Claims. (Cl. 30—283)

The present invention relates to cutting devices. In particular, the present invention relates to a hand knife of the type used for cutting bread, meat, and other foodstuffs.

An object of the present invention is to provide a hand knife of the above type which facilitates the cutting of uniform slices.

A further object of the present invention is to provide a hand knife by means of which the thickness of a slice may be readily controlled.

Another object of the present invention is to provide a hand knife which is adjustable to obtain slices of various thicknesses.

With the above objects in view the present invention mainly consists in a hand knife comprising an elongated cutting blade, a handle connected to one end of the cutting blade, and an elongated guide member extending parallel to and spaced laterally from the cutting blade adjustably mounted on the handle for movement toward and away from the cutting blade, whereby the guide member is adjustable for controlling the thickness of a slice of material cut by the blade.

Preferably the elongated guide member provided is adjustably mounted on the handle for movement in a direction normal to the cutting blade. Also, it is preferable to provide the guide member with a flat guide surface opposite the surface of the cutting blade for engagement with the side of the slice of material opposite to the side which is in contact with the cutting blade.

It is of advantage to have the guide surface of the guide member shorter than the cutting blade and to provide the guide member with a tapered end, so that the tip of the cutting blade may penetrate into the material to be sliced without hindrance from the guide member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view of a hand knife constructed according to the present invention;

Fig. 2 is a plan view of the device of Fig. 1; and

Fig. 3 is an end view of the device shown in Fig. 1 taken from the end of the cutting blade.

Referring now to the drawing, and in particular to Fig. 1, the device includes a cutting blade 9 at the end of which is secured a handle 1. Along the bottom surface of the handle 1 adjacent the blade end of the handle, a wedge-shaped rib 3 is provided extending perpendicular to the side faces of cutting blade 9, the rib 3 serving as a guide or track means for the guide member 5. The guide member 5 includes an elongated guide portion having a guide surface 2 which extends parallel to the cutting blade 9 and is spaced laterally from the blade. As shown in Figs. 1 and 3 the guide member 5 extends below the cutting edge 18 of the blade 9 with the guide surface 2 of the guide member 5 extending parallel with and facing the side face of cutting blade 9.

The end portion 14 of the guide member 5 adjacent the handle 1 is provided with a wedge-shaped groove 4 complementary to and slidably engaging wedge-shaped rib 3. The end portion 14 of guide member 5 is formed with an elongated slot 7 extending parallel to groove 4 and in which is inserted a headed bolt 6 having a threaded shank 6' which threadedly engages handle 1, being screwed into threaded aperture 12 extending into the bottom surface of handle 1.

By unscrewing the threaded bolt 6, the guide member 5 is unlocked from handle 1 and may be adjusted slidably along rib 3 in a direction normal to the side faces of cutting blade 9, so that the distance 10 between the guide face 2 of guide member 5 and the cutting blade 9 may be varied, as clearly shown by the different position of guide member 5 to which the latter may be moved as indicated by the dotted lines in Fig. 2.

As shown in the drawing, guide member 5 is shorter than cutting blade 9, so that the point of the cutting blade 9 can be inserted into the material to be sliced without interference from the end of guide member 5. As shown, guide member 5 is tapered toward its end.

To aid in the slicing operation, the upper surface of guide member 5 is cut away to provide a depressed portion or trough 8, which is engageable by a finger or thumb to assist in applying pressure on the knife and in guiding the device in the slicing operation. The depressed portion 8 is preferably provided with ridges 15 for producing a roughened surface to further assist in engagement of the finger with guide member 5.

In order to accurately control the thickness of a slice to be cut from a desired material, a scale 11 is provided on the front surface 17 of the end portion 14 of guide member 5 which extends parallel to groove 4. Guide member 5 may be adjusted with scale 11 indicating the thickness of a slice by reference either to an index mark provided on the front surface of handle 1 adjacent the scale, or, as shown in Fig. 3, with reference to cutting edge 18 of blade 9 serving as an index.

The cutting device of the present invention may also be so constructed that the handle is fixedly attached to guide member 5, and the cutting blade 9 arranged slidably adjustable on handle 1, by means similar to that described above with respect to adjustable guide member 5.

In the operation of the device above disclosed, the threaded bolt 6 is unscrewed sufficiently to allow adjustment of the guide member 5 with respect to cutting blade 9, the particular distance between blade 9 and guide member 5 being that of the desired thickness of slice, which may be accurately measured by use of and with reference to scale 11. After the desired spacing has been made, the threaded bolt 6 is screwed tightly into handle 1, thereby locking guide member 5 to handle 1 and holding guide surface 2 of guide member 5 in fixed spaced relation to cutting blade 9. Grasping the handle 1, guide surface 2 of guide member 5 is placed against the end of the material to be cut, and pressing down with the finger or thumb on depressed portion 8, cutting blade 9 is inserted into the material to be cut, and a slice is cut therefrom while the guide surface 2 abuts the opposite side of the slice. By this means, uniform slices of a desired and uniform thickness may be readily and accurately cut from the material in a simple and effective manner.

It will be understood that each of the elements described above, or two or more together, may also find a useful application in other types of cutting devices differing from the types described above.

While the invention has been illustrated and described as embodied in a hand knife for cutting foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hand knife, comprising, in combination, an elongated cutting blade having opposite side faces; a handle connected to one end of said cutting blade and having a rib at the bottom thereof extending between the sides of the handle normal to said side faces of said elongated cutting blade; an elongated guide member having a flat surface facing one of said side faces of said cutting blade and extending parallel to and spaced laterally from said cutting blade and having at one end a groove complementary to said rib of said handle and being mounted at said one end thereof on said handle with said groove slidably engaging said rib for adjustment of said guide member toward and away from said cutting blade; and means connecting said guide member at said one end to said handle for releasably locking said guide member in adjusted position on said handle, whereby said guide member is adjustable for controlling the thickness of a slice of material cut by said blade.

2. A hand knife, comprising, in combination, an elongated cutting blade having opposite side faces; a handle connected to one end of said cutting blade and having a rib at the bottom thereof extending between the sides of the handle normal to said side faces of said elongated cutting blade; an elongated flat guide member having a guide surface extending parallel to and spaced laterally from said cutting blade and an end portion adjustably mounted on said handle, said end portion having a groove complementary to said rib slidably engaging said rib for movement of said flat guide surface toward and away from said cutting blade and being formed with an elongated slot extending parallel to said groove; and screw means in said elongated slot connecting said guide member at said end portion to said handle for releasably locking said guide member in adjusted position on said handle, whereby said guide member is adjustable for controlling the thickness of a slice of material cut by said blade.

3. A hand knife comprising, in combination, an elongated cutting blade having opposite side faces and a cutting edge; a handle connected to one end of said cutting blade and having a wedge-shaped rib at the bottom thereof extending between its sides normal to said side faces of said elongated cutting blade; an elongated guide member having a flat guide surface extending parallel to and facing one of said side faces of said cutting blade, and having an end portion formed with a wedge-shaped groove complementary to said rib and slidably engaging the same for movement of said flat guide surface toward and away from said cutting blade, said end portion also being formed with a slot extending parallel to said groove therein, said guide member being offset from said cutting blade beyond said cutting edge thereof so that the upper edge of said guide member extending along said cutting blade lies substantially in a plane extending normal to the faces of said cutting blade and passing through the cutting edge thereof; and screw means in said slot connecting said guide member at said end portion to said handle for releasably locking said guide member in adjusted position on said handle, whereby said guide member is adjustable for controlling the thickness of a slice of material cut by said cutting blade.

References Cited in the file of this patent

UNITED STATES PATENTS

| 46,224 | Dow | Feb. 7, 1865 |
| 601,509 | Fowler | Mar. 29, 1898 |
| 1,760,575 | Andersson | May 27, 1930 |
| 1,893,113 | Syfrig | Jan. 3, 1933 |
| 2,081,361 | Marshall | May 25, 1937 |
| 2,168,237 | Polacsek | Aug. 1, 1939 |

FOREIGN PATENTS

| 53,089 | Germany | Feb. 21, 1890 |
| 327,082 | Great Britain | Mar. 27, 1930 |